No. 804,857. PATENTED NOV. 21, 1905.
H. P. JAMES.
ROPE MEASURING MACHINE.
APPLICATION FILED JULY 13, 1905.

Witnesses
E. J. Stewart
C. N. Woodward

Hattie P. James,
Inventor.
by C. A. Snow & Co.
Attorneys

UNITED STATES PATENT OFFICE.

HALLIE P. JAMES, OF HUMBOLDT, TENNESSEE.

ROPE-MEASURING MACHINE.

No. 804,857.  Specification of Letters Patent.  Patented Nov. 21, 1905.

Application filed July 13, 1905. Serial No. 269,542.

*To all whom it may concern:*

Be it known that I, HALLIE P. JAMES, a citizen of the United States, residing at Humboldt, in the county of Gibson and State of Tennessee, have invented a new and useful Rope-Measuring Machine, of which the following is a specification.

This invention relates to devices for measuring cordage of various kinds and similar products, and has for its object to improve the construction and increase the efficiency of devices of this character.

With these and other objects in view the present invention consists in the combination and arrangement of parts, as will be hereinafter fully described, shown in the accompanying drawings, and particularly pointed out in the appended claims.

Figure 1:
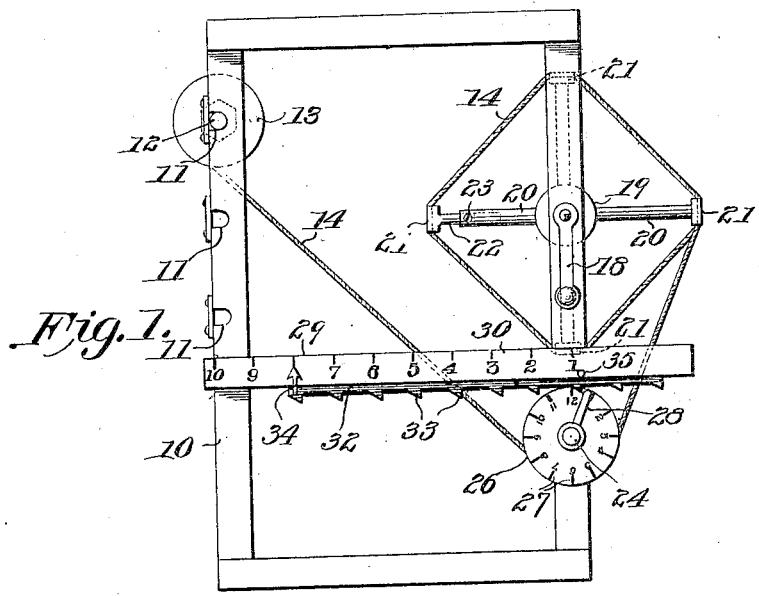
Figure 2:
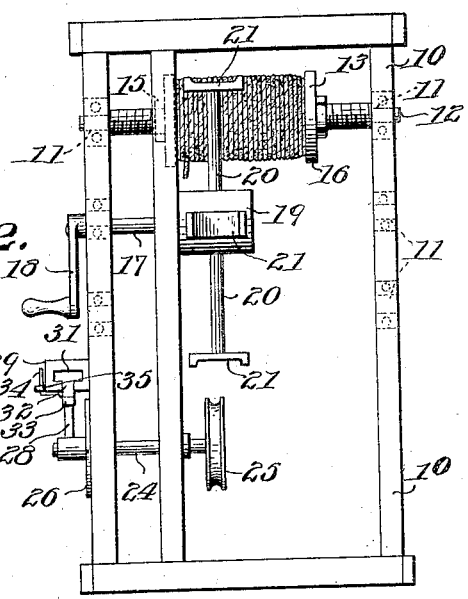

In the drawings, Figure 1 is a side elevation, and Fig. 2 is a front elevation, of the improved device.

In the improved device is comprised a supporting-frame 10 of any approved structure or of any required size and provided with a plurality of sockets 11 for receiving shafts for supporting the spools or reels containing the product to be measured.

Any required number of the spool-shafts may be employed to hold spools of different grades or sizes of cordage or similar products; but for the purpose of illustration one of the shafts only is shown at 12, mounted for rotation in one pair of the sockets and containing one of the spools or reels 13, supplied with cordage, as at 14.

The shaft 12 is threaded, as represented in Fig. 2, and supplied with nuts 15 16, bearing upon the ends of the spool to hold the spool in position, the shaft being thus capable of supporting spools of different lengths, as will be obvious.

Mounted for rotation in the frame 10 is a shaft 17, having at one end an operating-crank 18 and, with a winding-reel at the other end, consisting of a hub 19, radiating arms 20, the latter having concaved terminal blocks 21 to receive the cordage as it is unwound from the spool.

One of the arms 20 is hollow and shorter than the others, and the block 21 of the shorter arm is provided with a stud 22, extending into the hollow arm and held adjustably therein by a set-screw 23. By this means after the required amount of cord has been wound upon the reel the set-screw is loosened and the stud 22 permitted to move into the hollow arm a sufficient distance to release the cordage, as hereinafter more fully explained.

Mounted for rotation upon the frame 10 is a counter-shaft 24, having at one end a guide-pulley 25, operating in the path of the cordage as it passes from the spool to the reel.

Attached to the frame 10 concentric to the shaft 24 is a dial 26, having uniformly-spaced radial lines 27, and connected to the shaft 24 is an arm 28, serving as a pointer passing over the dial as the shaft is rotated.

The pulley 25 is one foot in circumference, and the graduations 27 are twelve in number, representing inches, so that as the cordage 14 passes from the spool to the reel and engages the pulley in its passage the pointer will denote number of inches unwound, as hereinafter explained.

Attached rigidly to the frame 10 is a bar 29, having graduations 30 thereon and also provided with a longitudinal channel for movably supporting a bar 32, having notches 33 corresponding to the graduations on the stationary bar 29.

The movable bar 32 is also provided with a pointer 34 for movement over the graduations 30 of the stationary bar 29, and the stationary bar is provided with a stop, as at 35, to engage the pointer 34 and limit the movement of the movable bar in one direction.

The arm 28 is extended for engagement consecutively with the notches 33, so that as the shaft 24 is rotated the arm 28 "picks" up the movable bar 32 and moves it the distance of one of its notches at each full revolution of the shaft.

When an order of cordage is to be measured, the bar 32 is drawn outward to the limit of its movement, or until the pointer 34 bears against the stop 35. The dial 26 is then rotated until the arm 28 is opposite the graduation 12 on the dial. The end of the cordage to be measured is then carried beneath the guide-pulley 25, attached to the nearest block 21, care being taken that the shaft 24 be rotated to a sufficient extent to cause the arm 28 to denote on the dial the length of cord between pulley and the block 21 to which it is attached. The crank-arm 18 is then rotated in the direction of the arrow in Fig. 1 to wind the required amount of cordage upon the reel, which will be denoted by the pointers 34 and 28.

For instance, suppose a customer orders seven and one-half feet of rope. The operator sets the device as above described and rotates the crank-arm 18 until the arm 28 has made seven full revolutions and "picked up" one of the teeth 33 and moved the bar 32 the distance of one of the notches at each revolution and likewise moved the pointer 34 until it is opposite the graduation No. 7 on one bar 30. The movement of the crank 18 is then continued until the pointer-arm 28 is opposite the graduation No. 6 on the dial 26 and the cordage severed at the lowermost point on the periphery of the pulley 25. Seven and a half feet of rope will then be upon the reel. The set-screw 23 is then loosened and the stud 23 forced into the hollow arm 21, which will so loosen the windings of cordage as to permit their ready removal from the reel.

It will thus be obvious that any required length of the cordage may be measured, and if a length greater than the bar 30 is required the bar 32 may be moved outward again to its first position and the operation repeated as often as required, care being taken to note the number of times the bar 32 is adjusted.

It will be obvious that a device is produced which is simple in construction, efficient in action, inexpensive to manufacture, and will be found very convenient and useful in retail stores in handling various sizes of cordage and similar products.

Having thus described the invention, what is claimed is—

1. In a device of the class described, a stationary bar having an internal guideway and with external graduations, a bar slidable in said guideway and provided with lugs spaced to correspond to said graduations, a pointer carried by said slidable bar for movement over said graduations, a shaft mounted for rotation and carrying a measuring-wheel and with radial arm for engagement with said lugs one at a time as the shaft is rotated, a dial concentric to said shaft and over which said arm rotates and provided with graduations corresponding to the graduations on said stationary bar and fractions of the same, and means for causing the rope to be measured to pass in contact with said measuring-wheel.

2. In a device of the class described, a stationary bar having an internal guideway and with external graduations, a bar slidable in said guideway and provided with lugs spaced to correspond to said graduations, a pointer carried by said slidable bar for movement over said graduations, a shaft mounted for rotation and carrying a measuring-wheel and with a radial arm for engagement with said lugs one at a time as the shaft is rotated, a dial concentric to said shaft and over which said arm rotates and provided with graduations corresponding to the graduations on said stationary bar and fractions of the same, means for supporting the rope to be measured at one side of said wheel, and a winding-reel mounted for rotation and disposed at the other side of said wheel.

In testimony that I claim the foregoing as my own I have hereto affixed my signature in the presence of two witnesses.

HALLIE P. JAMES.

Witnesses:
J. S. NISBET,
L. K. GILLESPIE.